(12) United States Patent
Zhou

(10) Patent No.: US 8,078,238 B2
(45) Date of Patent: Dec. 13, 2011

(54) ELECTRONIC DEVICE

(75) Inventor: Ri Zhou, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 284 days.

(21) Appl. No.: 12/482,543

(22) Filed: Jun. 11, 2009

(65) Prior Publication Data
US 2010/0173676 A1 Jul. 8, 2010

(30) Foreign Application Priority Data
Jan. 5, 2009 (CN) .............................. 200910300061

(51) Int. Cl.
H04M 1/00 (2006.01)

(52) U.S. Cl. ............... 455/575.1; 455/575.5; 455/575.2; 455/575.4

(58) Field of Classification Search ............... 455/575.1, 455/575.2, 575.4, 575.5
See application file for complete search history.

(56) References Cited

U.S. PATENT DOCUMENTS
6,151,486 A * 11/2000 Holshouser et al. ........ 455/575.3
7,079,872 B2 * 7/2006 Khalid et al. ................. 455/566
* cited by examiner Primary Examiner — Kamran Afshar
Assistant Examiner — Yousef Rod
(74) Attorney, Agent, or Firm — Altis Law Group, Inc.

(57) ABSTRACT

An electronic device includes a main body, a display module, a first magnet, a second magnet and a third magnet. The display module rotatably positioned on the main body includes a first surface and a second surface. The first magnet and the second magnet are positioned on one of the main body and the display module, and the third magnet is positioned on the other of the main body and the display module. The third magnet is an electromagnet. The third magnet can selectably face one of the first magnet and the second magnet by changing the polarity of the third magnet, thereby, the display module can rotate relative to the main body and can be fixed at a different position.

16 Claims, 4 Drawing Sheets

ELECTRONIC DEVICE

BACKGROUND

1. Technical Field

The present disclosure generally relates to electronic devices, and particularly, to a portable electronic device.

2. Description of Related Art

Consumers may desire a mobile phone with two display screens for displaying different images.

A typical foldable type mobile phone includes a cover and a main body. A first display screen and a second display screen are mounted at opposite sides of the cover. The cover needs to be unfolded to expose the second display screen and a keypad on the main body, and the cover needs to be folded upon the main body or the phone turned over to allow the first display screen to face a user. However, the cover of the mobile phone should be operated to fold upon or unfold from the main body by holding the main body and applying a force on the cover simultaneously. Thus, it is inconvenient to operate the mobile phone.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
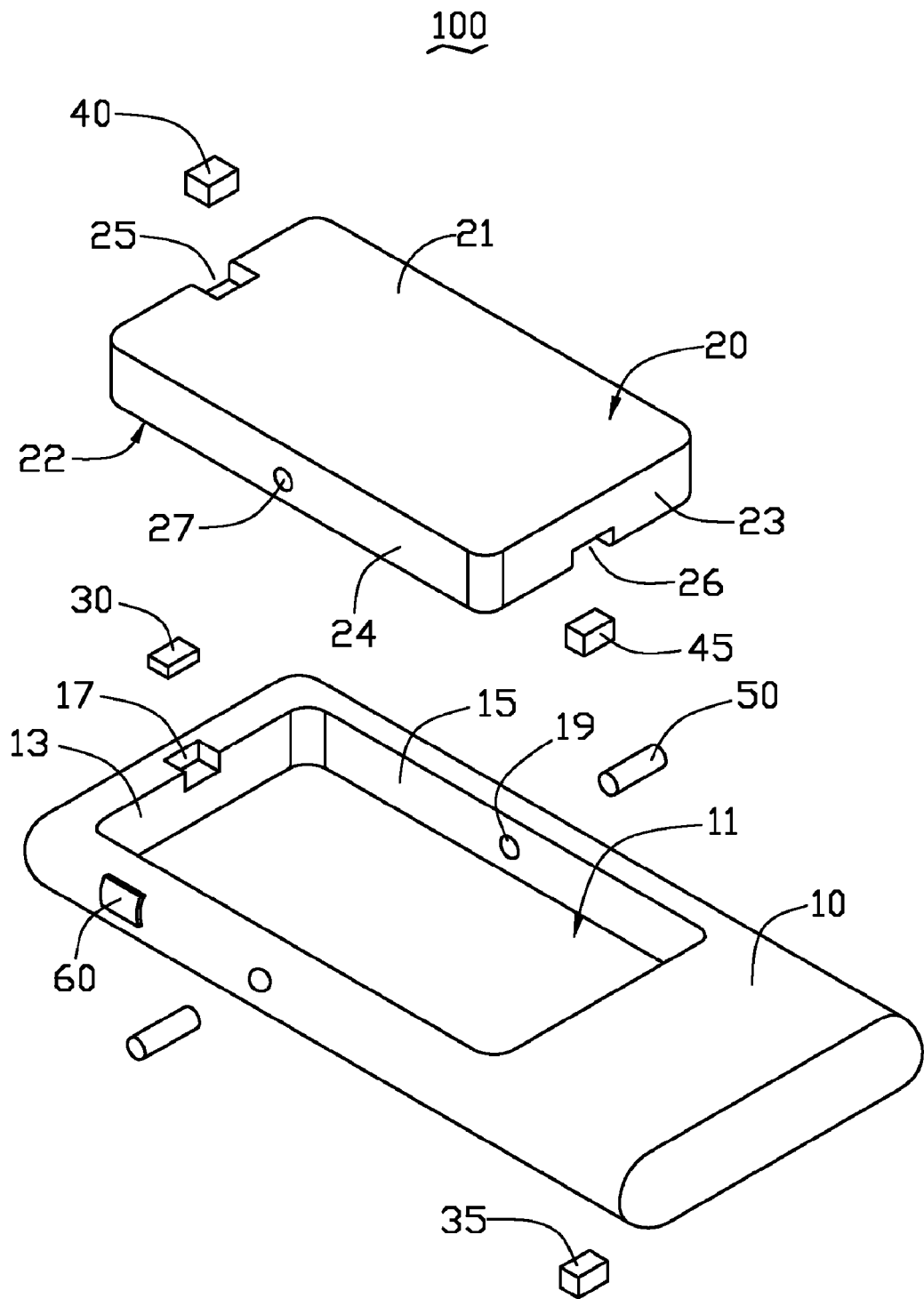
FIG. 1 is an exploded, isometric view of one embodiment of an electronic device, the electronic device including a main body and a display module.

Referring to FIG. 1, one embodiment of an electronic device 100 is a mobile phone, including a main body 10, a display module 20, a first magnet 30, a second magnet 35, a third magnet 40, a fourth magnet 45, two pivot shafts 50, and a control module 60. The display module 20 is rotatably positioned on the main body 10. The first magnet 30, the second magnet 35, and the control module 60 are positioned on the main body 10. The third magnet 40 and the fourth magnet 45 are positioned on the display module 20. The first magnet 30 is positioned correspondingly to the third magnet 40, and the second magnet 35 is positioned correspondingly to the fourth magnet 45. At least one of the first magnet 30, the second magnet 35, the third magnet 40, and the fourth magnet 45 is an electromagnet. The control module 60 is used for changing the polarity of the electromagnetic magnet. In the illustrated embodiment, the first magnet 30 and the second magnet 35 are electromagnets.

Figure 2:
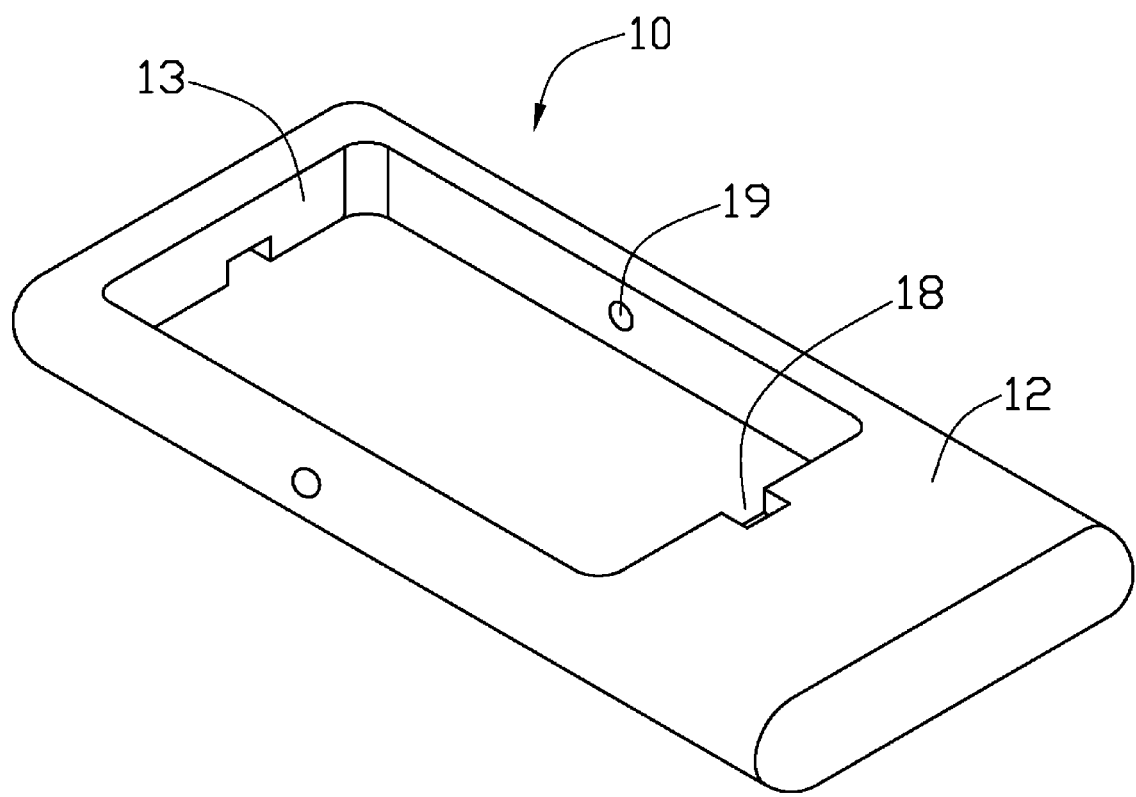
FIG. 2 is an isometric view of the main body of the electronic device in FIG. 1, but viewed from another aspect.

Referring also to FIG. 2, the main body 10 includes a receiving portion 11 and a front surface 12. Generally, a keypad (not shown) is positioned on the front surface 12 of the main body 10. The receiving portion 11 includes two opposite first sidewalls 13 and two opposite second sidewalls 15. Each second sidewall 15 connects with the first sidewalls 13. One of the first sidewalls 13 defines a first receiving slot 17 for receiving the first magnet 30. The other one of the first sidewalls 13 defines a second receiving slot 18 for receiving the second magnet 35. Each second sidewall 15 defines an engaging hole 19 in the center. Each of the pivot shafts 50 engages in a corresponding engaging hole 19. In the illustrated embodiment, the first receiving slot 17 is closer to the front surface 12 of the main body 10 than to the rear surface opposite to the front surface 12, and the second receiving slot 18 is closer to the rear surface of the main body 10 than to the front surface 12. In other words, the first receiving slot 17 and the second receiving slot 18 are staggered a distance at thickness direction of the main body 10.

The display module 20 includes a first surface 21, a second surface 22 opposite to the first surface 21, two first sides 23 opposite to each other, and two second sides 24 opposite to each other. Each second side 24 connects with the first sides 23. One of the first sides 23 defines a first engaging slot 25, and the other one of the first sides 23 defines a second engaging slot 26. The third magnet 40 and the fourth magnet 45 are received in the first engaging slot 25 and the second engaging slot 26 correspondingly. In the illustrated embodiment, a display screen is positioned in each of the first surface 21 and the second surface 22. The first engaging slot 25 is arranged closer to the first surface 21 of the display module 20 than the second surface 22, the second engaging slot 26 is arranged closer to the second surface 22 of the display module 20 than the first surface 21. In other words, the first engaging slot 25 and the second engaging slot 26 are staggered a distance in the thickness direction of the display module 20. Each second side 24 defines a positioning hole 27 for receiving one of the pivot shafts 50. In the illustrated embodiment, each positioning hole 27 is defined in the center of each second side 24.

Figure 3:
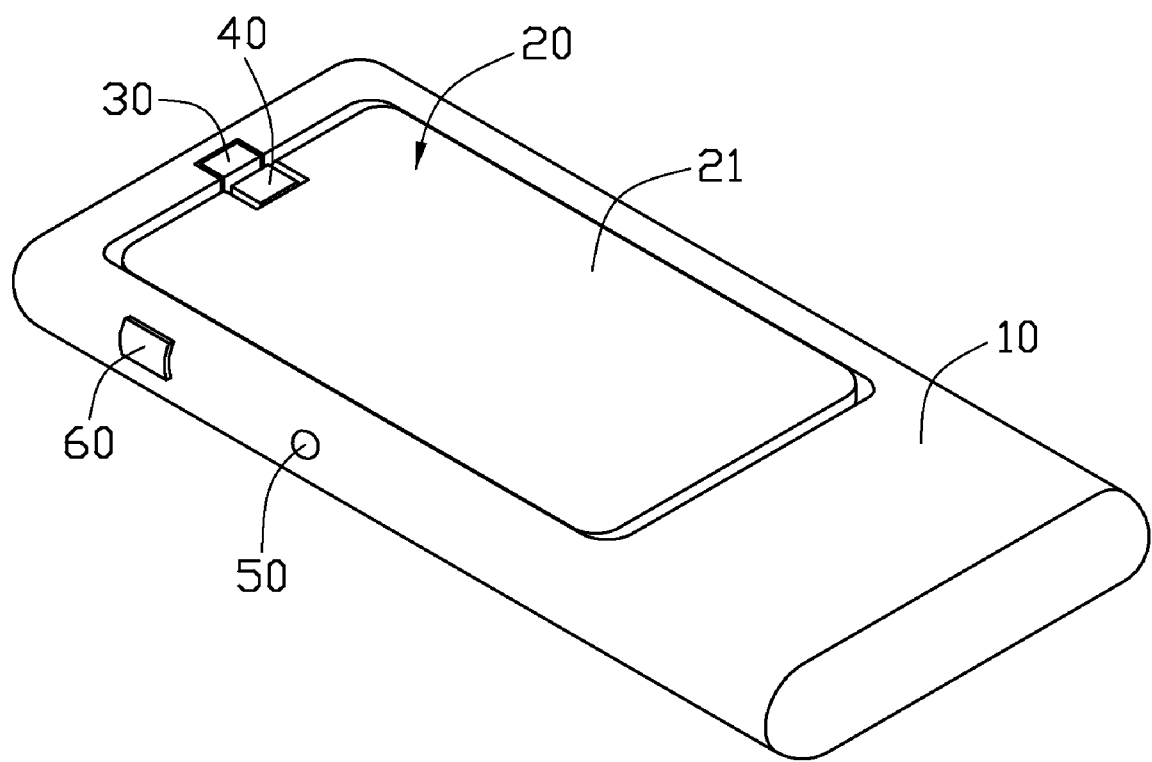
FIG. 3 is an assembled, perspective view of the electronic device in FIG. 1.

Referring also to FIG. 3, when assembling the electronic device 100, the first magnet 30 is engaged in the first receiving slot 17, the second magnet 35 is engaged in the second receiving slot 18. The third magnet 40 is received in the first engaging slot 25, the fourth magnet 45 is received in the second engaging slot 26. The display module 20 is received in the receiving portion 11 of the main body 10, and each of the pivot shafts 50 is engaged in one of the engaging holes 19 of the main body 10 and one corresponding positioning hole 27 of the display module 20. As such, the electronic device 100 is assembled. The pivot shafts 50 are coaxial. When the electronic device 100 is in a first state, both the first surface 21 and the front surface 12 of the main body 10 face a user. The polarity of the first magnet 30 and the third magnet 40 facing each other are different. The polarity of the second magnet 35 and the fourth magnet 45 facing each other are different, thus attracting forces are generated between the first magnet 30 and the third magnet 40, and between the second magnet 35 and the fourth magnet 45. Thus, the display module 20 is positioned in the receiving portion 11. The polarity of the magnetic poles, facing the display module 20, of the first magnet 30 and the second magnet 35 may be the same or different.

Figure 4:
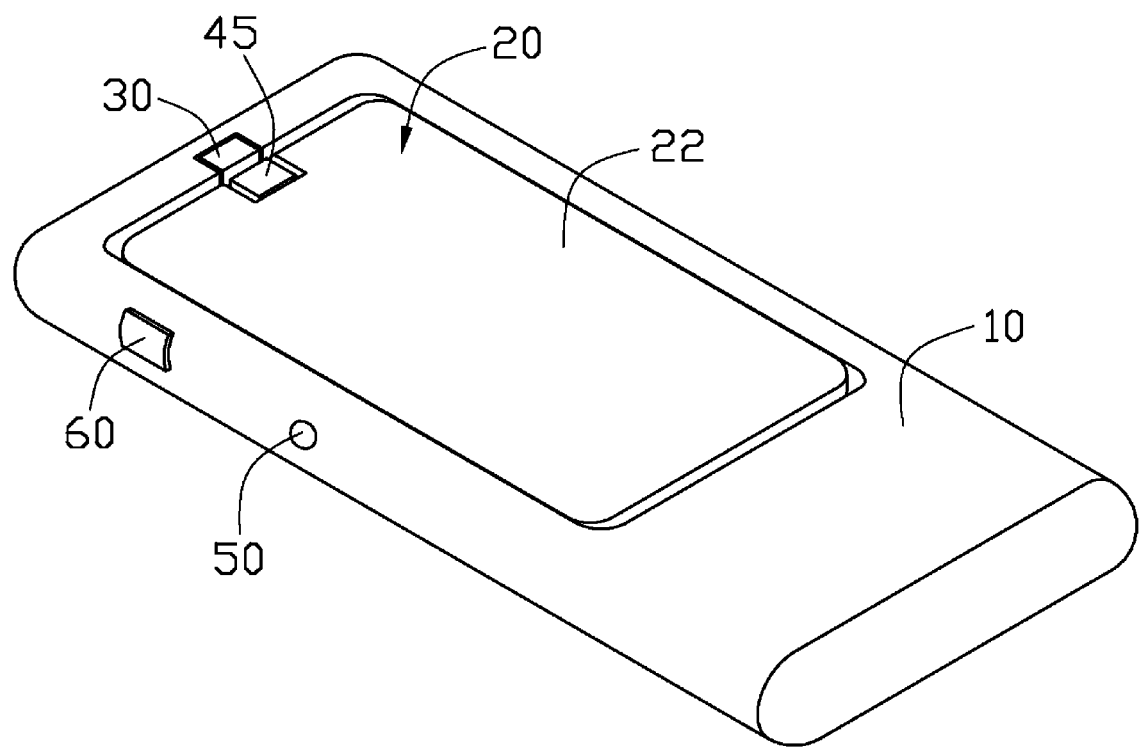
FIG. 4 is similar to FIG. 3, but viewed from another aspect.

Referring also to FIG. 4, in use, when a user wants to see the display screen on the second surface 22, the electronic device 100 is turned from the first state to a second state. The control module 60 is operated to change the polarities of the first magnet 30 and the second magnet 35, so that, the polarities of the first magnet 30 and the third magnet 40 are the same, and the polarities of the second magnet 35 and the fourth magnet 45 are the same. Thus, repulsive magnetic forces generated between the first magnet 30 and the third magnet 40, and between the second magnet 35 and the fourth magnet 45 force the display module 20 to rotate around the pivot shafts 50.

In the case of the polarity of the magnetic poles, facing the display module 20, of the first magnet 30 and the second magnet 35 are the same, when the display module 20 rotates through 90 degrees, the control module 60 is operated again to change the polarities of the first magnet 30 and the second magnet 35. Once the polarities are changed, attracting forces are generated between the first magnet 30 and the fourth magnet 45 and between the second magnet 35 and the third magnet 40. Thus, the display module 20 is forced to rotate through another 90 degrees. As such, both the second surface 22 and the front surface 12 of the main body 10 face a user. In the case of the polarity of the magnetic poles, facing the display module 20, of the first magnet 30 and the second magnet 35 are different, when the display module 20 rotates through 90 degrees, attracting forces are generated between the first magnet 30 and the fourth magnet 45 and between the second magnet 35 and the third magnet 40. Therefore, both the second surface 22 and the front surface 12 of the main body 10 face a user.

The display module 20 can be rotated relative to the main body 10 by operating the control module 60, so thin the first surface 21 and the second surface 22 selectably faces the user. Therefore, the electronic device 100 is convenient to operate.

It can be understood that, the third magnet 40, and the fourth magnet 45 may be replaced by electromagnetic magnets. Furthermore, the fourth magnet 45 may be omitted, and the third magnet 40 may be an electromagnet. When the polarity of the third magnet 40 changes, a repulsive force is generated between the third magnet 40 and the first magnet 30, and an attracting force is generated between the third magnet 40 and the second magnet 35, thus, the first surface 21 of the display module 20 is rotated to the second surface 22. Similarly, the second magnet 35 may be omitted, and the first magnet 30 be an electromagnet.

The first magnet 30 and the second magnet 35 may be positioned on two second sidewalls 15 correspondingly, the third magnet 40 and the fourth magnet 45 may be positioned two second sides 24 correspondingly. As long as the total forces generated among the first magnet 30, the second magnet 35, the third magnet 40 and the fourth magnet 45 may rotate the first surface 21 of the display module 20 to the second surface 22.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device, comprising:
   a main body defining a receiving portion, the receiving portion including two opposite first sidewalls;
   a display module, rotatably positioned on the main body, comprising a first surface, a second surface and two opposite first sides, the first sidewalls face the first sides correspondingly;
   a first magnet and a second magnet positioned on the first sides correspondingly; and
   a third magnet and a fourth magnet positioned on the first sidewalls correspondingly;
   wherein the third magnet and the fourth magnet selectably faces the first magnet and the second magnet to force one of the first surface and the second surface facing a predetermined direction depending on the polarity of the first magnet and the second magnet.

2. The electronic device of claim 1 further comprising a control module used to change the polarity of the electromagnetic magnet.

3. The electronic device of claim 1, wherein the third magnet and the fourth magnet is an electromagnet.

4. The electronic device of claim 3, wherein the polarity of the magnetic poles, facing the display module, of the third magnet and the fourth magnet, are different.

5. The electronic device of claim 3, wherein the polarity of the magnetic poles, facing the display module, of the third magnet and the fourth magnet are the same.

6. The electronic device of claim 1, wherein the first magnet and the second magnet are staggered a distance in the thickness direction of the display module, the third magnet and the fourth magnet are staggered a distance in the thickness direction of the main body.

7. The electronic device of claim 1 further comprising two pivot shafts positioned on the main body and the display module to rotatably connect the display module to the main body.

8. The electronic device of claim 7, wherein the receiving portion of the main body further comprises two second sidewalls correspondingly connecting with the first sidewalls, and each second sidewall defines a positioning hole, the display module further comprises two second sides correspondingly connecting with the first sides, and each second side defines an engaging hole, each pivot shaft engages in one of the engaging holes and one corresponding positioning hole.

9. The electronic device of claim 8, wherein each positioning hole is defined in the center of each second sidewall, each engaging hole is defined in the center of each second side, each pivot shaft engages in one of the engaging holes and one corresponding positioning hole.

10. The electronic device of claim 9, wherein the pivot shafts are coaxial.

11. The electronic device of claim 1, wherein a display screen is positioned on each of the first surface and the second surface.

12. An electronic device, comprising:
    a main body;
    a display module, rotatably positioned on the main body, comprising a first surface and a second surface;
    a first magnet and a second magnet positioned on one of the main body and the display module; and
    a third magnet and a fourth magnet positioned on the other of the main body and the display module;
    wherein the polarity of the first magnet and the second magnet are changeable so that a rotational torque is generated between the third magnet, the fourth magnet, the first magnet and the second magnet, to rotate the display module.

13. The electronic device of claim 12, further comprising a control module used to change the polarity of the first magnet and the second magnet.

14. The electronic device of claim 13, wherein the first magnet and the second magnet are positioned on the display module, the third magnet and the fourth magnet are positioned on the main body; an attracting force is generated between one of the third magnet and the fourth magnet and one of the first magnet and the second magnet.

15. The electronic device of claim 12, further comprising two pivot shafts positioned on the main body and the display module to rotatably connect the display module to the main body.

16. The electronic device of claim 15, wherein the main body defines a pair of positioning holes, the display module defines a pair of engaging holes, each pivot shaft engages in one of the engaging holes and one corresponding positioning hole.

* * * * *